(12) United States Patent
Barmichev et al.

(10) Patent No.: US 9,868,540 B2
(45) Date of Patent: Jan. 16, 2018

(54) AIRCRAFT ENGINE MOUNTING SYSTEM

(71) Applicant: The Boeing Company, Chicago, IL (US)

(72) Inventors: Sergey D. Barmichev, Kirkland, WA (US); David W. Kirkbride, Allyn, WA (US); Mithra M. K. V. Sankrithi, Lake Forest Park, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/359,965

(22) Filed: Nov. 23, 2016

(65) Prior Publication Data

US 2017/0073078 A1   Mar. 16, 2017

Related U.S. Application Data

(63) Continuation of application No. 14/457,287, filed on Aug. 12, 2014, now Pat. No. 9,533,768.

(51) Int. Cl.
*B64D 27/02* (2006.01)
*B64C 25/04* (2006.01)
(Continued)

(52) U.S. Cl.
CPC ............. *B64D 27/26* (2013.01); *B64C 3/32* (2013.01); *B64C 25/04* (2013.01); *B64C 25/34* (2013.01);
(Continued)

(58) Field of Classification Search
CPC ........ B64D 27/02; B64D 27/06; B64D 27/08; B64D 27/12; B64D 27/14; B64D 27/18;
(Continued)

(56) References Cited

U.S. PATENT DOCUMENTS 2,469,619 A * 5/1949 Warner .................... B60V 1/08
244/12.6
2,611,556 A * 9/1952 Custer .................. B64C 39/066
244/12.6
(Continued)

FOREIGN PATENT DOCUMENTS

GB          139984 A  *  3/1920  ............. B64C 25/04
GB          144867 A  *  6/1920  ............. B64C 25/04

*Primary Examiner* — Richard R Green
(74) *Attorney, Agent, or Firm* — Miller, Matthias & Hull LLP

(57) ABSTRACT

An aircraft includes an engine mounted to a wing by a first support, such as a strut, configured to secure the engine to the wing in a position above the wing. A second support, secured to a fuselage portion of the aircraft, is defined by a bridge structure configured to separately and independently secure the engine to the fuselage. The engine is thus secured by the first support directly to the aircraft wing, and via the second support, in concert with the first, to a portion of an aircraft fuselage spaced laterally of the engine-to-wing attachment. In one embodiment the bridge structure, which extends between the engine and fuselage, may be bowed upwardly so as to define a convex curvature when viewed along the longitudinal axis of the aircraft. Such a curvature may, inter alia, optimize aerodynamic spacing of the bridge from the wing to minimize undesirable shock waves.

20 Claims, 5 Drawing Sheets

(51) Int. Cl.
*B64C 3/32* (2006.01)
*B64D 27/26* (2006.01)
*B64D 29/02* (2006.01)
*B64D 29/04* (2006.01)
*B64C 25/34* (2006.01)
*B64D 27/00* (2006.01)

(52) U.S. Cl.
CPC ............. *B64D 27/02* (2013.01); *B64D 29/02* (2013.01); *B64D 29/04* (2013.01); *B64D 2027/005* (2013.01); *B64D 2027/262* (2013.01); *B64D 2027/264* (2013.01); *Y02T 50/66* (2013.01)

(58) Field of Classification Search
CPC .. B64D 27/20; B64C 1/16; B64C 3/32; B64C 25/04
See application file for complete search history.

(56) References Cited

U.S. PATENT DOCUMENTS

| | | | | |
|---|---|---|---|---|
| 5,082,204 A | * | 1/1992 | Croston | B64C 39/10 244/126 |
| 5,149,016 A | * | 9/1992 | Huhn | B64D 27/02 244/12.3 |
| 5,597,137 A | * | 1/1997 | Skoglun | B64C 29/0033 244/12.4 |

* cited by examiner

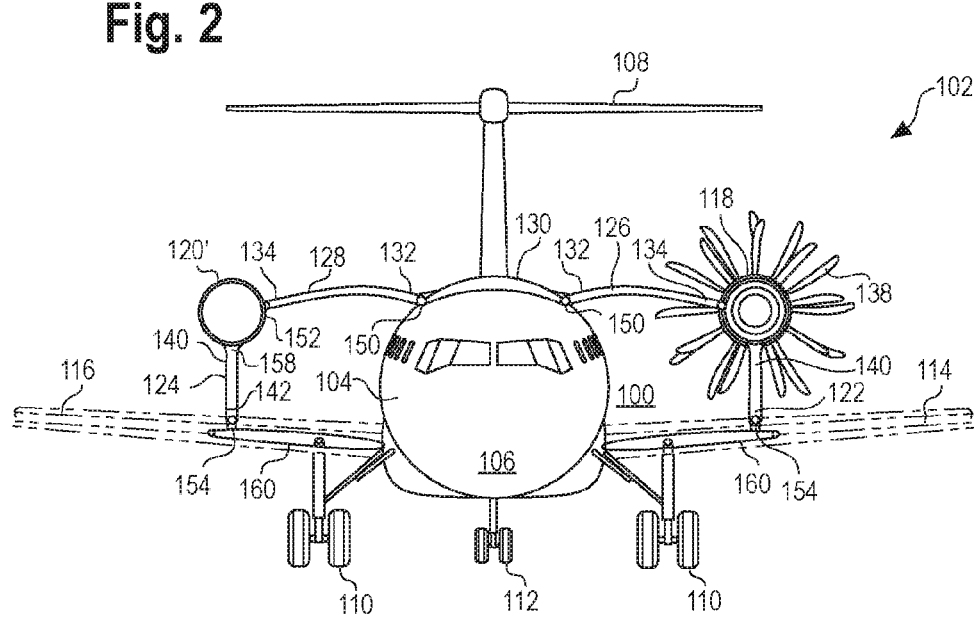
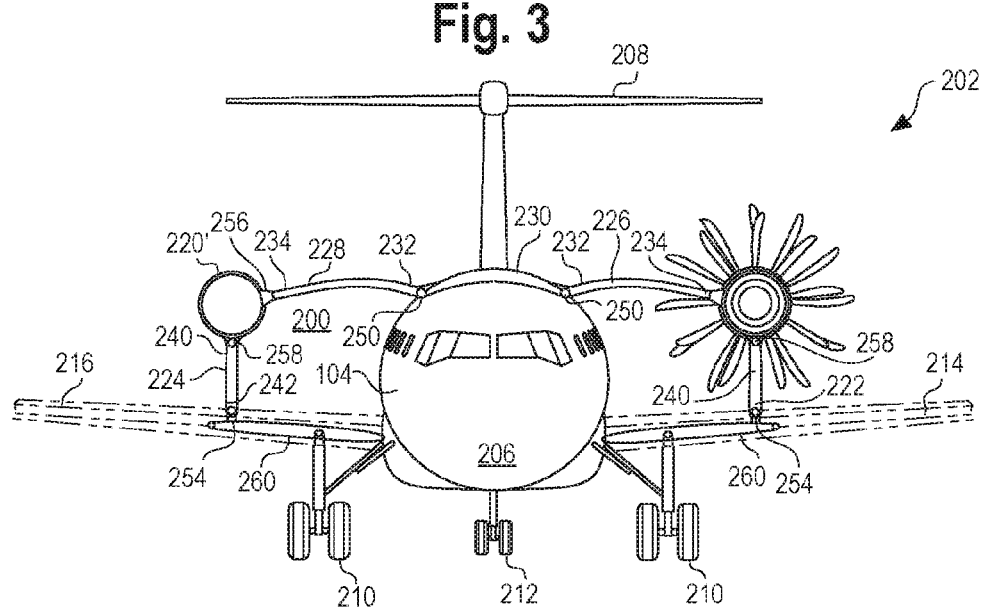

AIRCRAFT ENGINE MOUNTING SYSTEM

CROSS-REFERENCE TO RELATED APPLICATION

This application is a straight continuation of, and claims priority under 35 USC §119 (e) to, previously filed application, U.S. Ser. No. 14/457,287, filed Aug. 12, 2014.

FIELD

The present disclosure relates generally to aircraft engine attachment structures, and more specifically to apparatus configured for mounting and securing an aircraft engine to an aircraft.

BACKGROUND

Various strut and pylon configurations are utilized for mounting and securing both open rotor and turbofan propulsor engines to commercial aircraft. Typically, such engines are attached by struts and/or via pylons to the aircraft wings or to the airframe of the aircraft. The airframe (sometimes referred to as a primary structure or fuselage) consists of a series of vertically and horizontally oriented framing or ribs that encircle a cabin area for transporting personnel and cargo. The outboard of the airframe is generally covered with a metal or composite skin, while the interior of the airframe may be generally covered with sidewall trim panels formed of, for example, reinforced molded plastic.

Propulsor engines are commonly attached to aircraft in a variety of locations, including the wings, tails, and even within the nose of the fuselage in cases of single engine aircraft. Engines are also secured to the tops of fuselages in cases of some seaplanes adapted for landing and taking off from water. For most commercial aircraft, however, at least two engines are generally involved, and they are most often attached directly to the wings or to the tail or empennage of the aircraft.

Commercial aircraft with wing mounted propulsor engines typically support such engines for suspension slightly below the physical wing structure of the aircraft. Such designs are associated with numerous passenger aircraft cabin benefits, including reduction of engine noise and noise from outside air turbulence. In response to continued demands for increased performance, however, and as the physical sizes of such wing mounted engines have come close to their practical size limits, there are greater incentives for physically placing commercial aircraft engines above, rather than below, the wings.

Several challenges are presented by larger above wing propulsor engines, including a need to compensate for increased engine and turbulence noises associated with having engines above rather than below the wing, the latter due in part to greater torsional vibrations associated with physically larger engines. At least one approach to reducing associated noises may be to reduce levels of physical vibrations by making improvements in apparatus and methods of mounting and securing the engines to the aircraft.

Thus, it is therefore desirable to provide a novel aircraft engine mounting and securement system for increasingly larger above wing engines.

SUMMARY

In accordance with one aspect of the present disclosure, an aircraft engine is configured to be mounted to a wing by a first support fixed to the wing. The first support, such as a strut, is adapted to secure the engine to the wing in a position above the wing. A second support, herein variously called a bridge or a bridge support, is configured to secure the above wing engine to an aircraft fuselage, the first and second supports providing a novel propulsor engine mounting and securement system.

In accordance with another aspect of the present disclosure, the bridge extends laterally above the wing, between the engine and the fuselage of the aircraft.

In accordance with another aspect of the present disclosure, the bridge is bowed upwardly so as to have a concave curvature when viewed along a longitudinal fore-aft axis of the aircraft.

In accordance with another aspect of the present disclosure, the bridge attaches at an angle approximately perpendicularly to the curved surface of the fuselage.

In accordance with yet another aspect of the present disclosure, the bridge has at least one flexible pivot connection to at least one of the engine and the fuselage.

In accordance with yet another aspect of the present disclosure, the bridge is formed of a metal.

In accordance with yet another aspect of the present disclosure, the bridge is formed of a load truss system.

In accordance with yet another aspect of the present disclosure, the bridge is formed of a high strength composite material.

In accordance with yet another aspect of the present disclosure, the bridge is formed of a laterally extending composite structure.

In accordance with yet another aspect of the present disclosure, an aircraft includes at least two engines, one on each wing, each engine having a bridge extending to and secured to the fuselage, wherein respective ends of the bridges are connected to the fuselage via a structural crown member fixed to an upper portion of the fuselage.

In accordance with yet another aspect of the present disclosure, a method of securing an aircraft engine to an aircraft fuselage includes the steps of providing a fuselage having a wing fixedly joined thereto, providing a first engine support configured to secure the aircraft engine to the wing in a position above the wing, and providing a second engine support configured to extend from the fuselage above the wing to secure the engine directly to the fuselage, and thus separately from the first engine support that secures the engine directly to the wing.

In accordance with yet another aspect of the present disclosure, the method further includes the first engine support being an upwardly extending wing strut, and the second engine support being a bridge extending laterally from the fuselage.

The features, functions, and advantages disclosed herein can be achieved independently in various embodiments or may be combined in yet other embodiments, the details of which may be better appreciated with reference to the following description and drawings.

BRIEF DESCRIPTION OF THE DRAWINGS

FIG. 2 is a front elevational view of another described embodiment of the commercial aircraft, representing a modification of the first embodiment of FIG. 1.

FIG. 3 is a front elevational view of yet another described embodiment of the commercial aircraft that represents a further modification of the embodiments of FIGS. 1 and 2.

Figure 1:
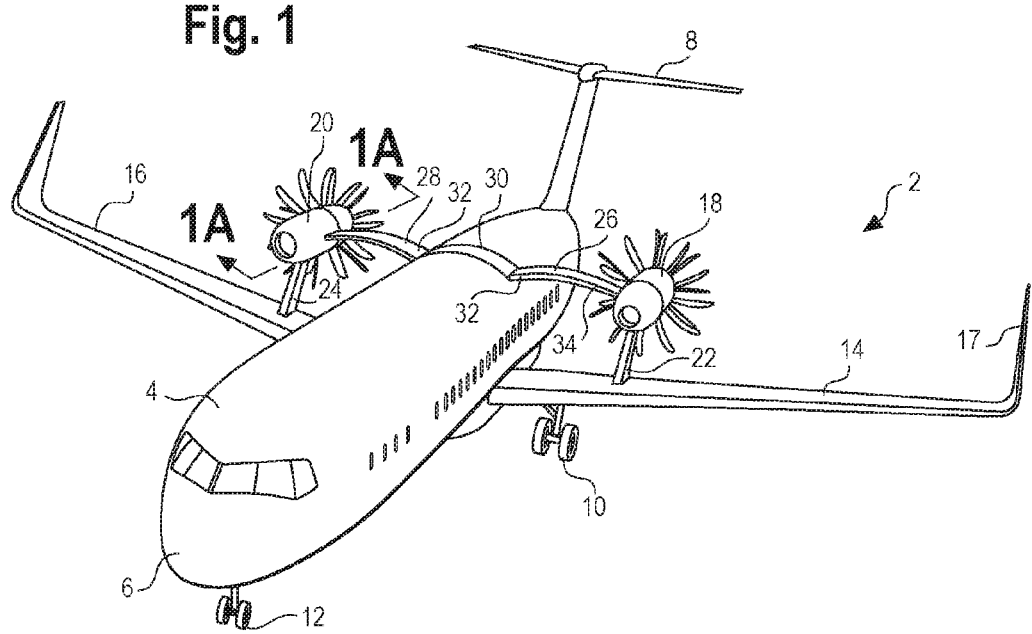
FIG. 1 is a perspective view of a low wing commercial aircraft with a pair of engines, one installed above each wing, the engines mounted and secured in accordance with first and second structural supports of the present disclosure.

It should be understood that the drawings are not necessarily to scale, and that disclosed embodiments are illustrated only schematically. It should be further understood that the following detailed description is merely exemplary and not intended to be limiting in application or uses. As such, although the present disclosure is, for purposes of explanatory convenience, depicted and described in only the illustrative embodiments presented, the disclosure may be implemented in numerous other embodiments, and within various other systems and environments not shown or described herein.

DETAILED DESCRIPTION

The following detailed description is intended to provide both apparatus and methods for carrying out the disclosure. Actual scope of the disclosure is as defined by the appended claims.

In the drawings, the terms left and right shall reference an orientation from the vantage point of a person facing forwardly within a cabin or fuselage of an aircraft. Other terms will be apparent from context. With respect to drawing references to elements depicted, as each new embodiment is introduced, the elements that remain similar to their previously introduced embodiments will share similarly numbered relationships, though separated by a multiple of one hundred. For example, the main landing gear of the aircraft as depicted in FIG. 1 is referenced as element 10, while in FIG. 2 is referenced as element 110, and in FIG. 3 is referenced as element 210, etc., unless otherwise indicated.

Also, the combination of aircraft rotors and the engines to which the rotors are rotatably secured are sometimes called propulsors, but are more commonly simply called aircraft "engines". Within this disclosure, however, they may also be called propulsor engines.

FIG. 1 illustrates a commercial aircraft 2, having a fuselage 4, including a nose 6, rear or tail control surfaces 8, and supported on a pair of main landing gears 10, as well as a nose gear 12. Extending from each side of the fuselage 4 are left and right wings 14, 16, also variously called wing structures, which may or may not include outboard upwardly extending winglets 17, installed on some aircraft to conserve fuel usage.

Left and right engines 18, 20 are supported on respective left and right struts 22, 24. Each strut 22, 24 is configured to affix an engine 18, 20, to a respective wing 14, 16 in a position above the wing, as shown.

In addition to support provided by the struts 22, 24, each engine 18, 20 is also supported by left and right bridges 26, 28, each extending laterally, and configured to respectively connect each engine 18, 20 to the fuselage 4. Each bridge is configured to provide a structural connection between the fuselage and an engine, and as such may, in concert with the wing struts 22, 24, better secure and support larger engines against deleterious vibrations. Thus, the disclosed strut and bridge combination may act to enhance positional stability of the engine relative to the aircraft by reducing engine induced structural vibrations that occur under various asymmetric and torsional force loads encountered during aircraft flight, particularly under instances of severe turbulence.

Although ends 32 of each bridge 26, 28 that are proximal to the fuselage 4 may be simply secured into the structural framing or ribs (not shown) of the fuselage 4, this disclosure also provides a fuselage crown support 30 to assist in carrying some of the loads otherwise imposed on the fuselage 4 by the bridges 26, 28. The fuselage crown support 30 may be integrally secured to the top of the fuselage in areas of greatest potential stress, and at connection points beneath the airframe skin, so as to avoid induced drag forces.

Figure 1A:
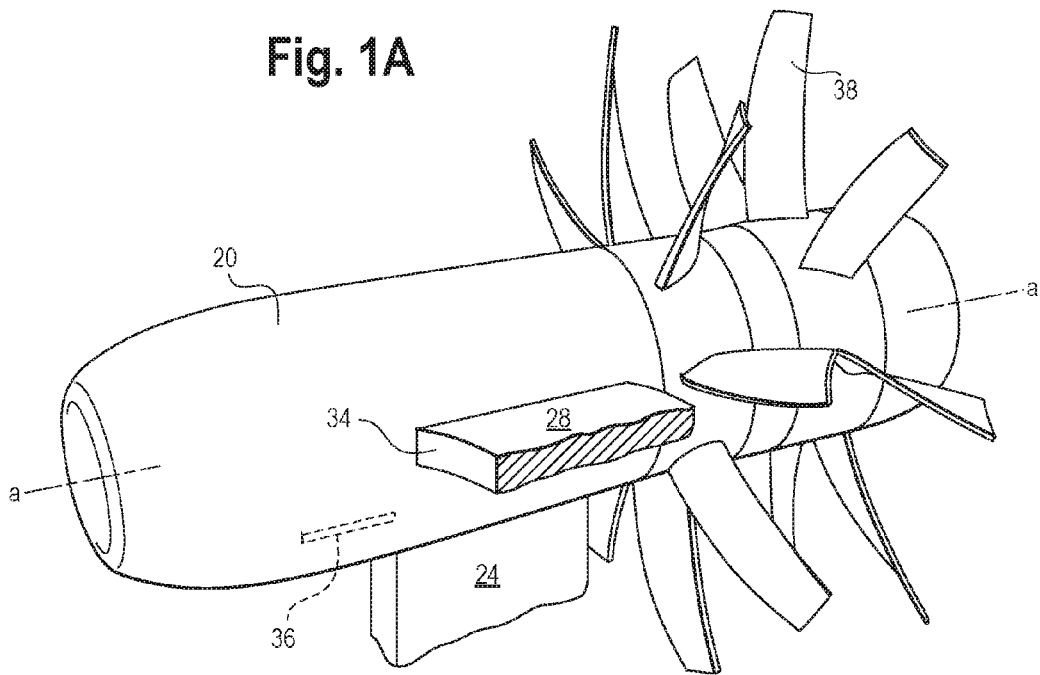
FIG. 1A is a view of one of two open rotor-style engines utilized in the embodiment of FIG. 1, along lines 1A-1A of FIG. 1.

Referring now to FIG. 1A, a depiction of the right engine 20 reveals an open rotor-style engine that may be utilized in the commercial aircraft 2 of FIG. 1. The engine 20 has a structural frame 36 (depicted only schematically) by which the engine 20 is supported on both the support strut 24 and the right fuselage support bridge 28. In FIG. 1A, the engine 20 is more clearly shown secured to an end 34 of the support bridge 28. In combination, the strut 24 and the support bridge 28 provide a complementary support system for the above wing engine 20. The struts 24 and support bridge 28 may be formed of metal, such as a high strength aluminum alloy. The bridge 28 may also be formed of a high strength composite structure. Finally, the engine 20 incorporates a plurality of angularly oriented, external rotors or blades 38 adapted for powered rotation about a longitudinally extending fore-aft axis "a-a" as shown.

Referring now to FIG. 2, another embodiment of a commercial aircraft 102 incorporates further enhancements with respect to bridges 126 and 128 configured to support engines (and engine mounts) 118 and (120'), respectively. FIG. 2 depicts a view with the right engine removed, showing only an engine mount 120', for clarity of depiction.

Thus, in FIG. 2, each bridge support 126 and 128 acts as a lateral engine load-carrying member, as in the embodiment of FIG. 1. The aircraft 102 also includes a crown support 130 to reinforce load carrying ability of the fuselage in areas of greatest potential stress. However, the ends 132 of each bridge 126, 128 have a connection to the fuselage defined by a pivoted joint 150. Similarly, the ends 134 of each bridge 126, 128 have a connection to each engine (or engine mount) 118 (120') via a pivoted joint 152. Finally, the lower ends 142 of the struts 122, 124 may also have pivoted joints 154 by which they are connected to the engine (or engine mount) 118 (120'). This arrangement of connections within a closed or boxed structural support loop path 100, which incorporates the engine, bridge, airframe including crown supports, wing, and struts, provides that the upper ends 140 of the struts 122, 124 may be joined via cantilevered connection 158 directly to the engine (or engine mount) 118 (120'). Such arrangement may inter alia facilitate engine maintenance.

Turning now to FIG. 3, a commercial aircraft 202 incorporates another embodiment of pivoted joint connections between struts 222 and 224 and bridge supports 226 and 228 of engines (and engine mounts) 218 (220'), respectively. Again, FIG. 3 depicts a view analogous to that of FIG. 2; i.e., with the right engine removed, to reveal only an engine mount 220', for clarity.

In the embodiment of FIG. 3, each bridge support 226 and 228 acts as an engine load-carrying member as in the embodiments of FIGS. 1 and 2, and may also include a similar crown support 230 to reinforce the load carrying ability of the fuselage in an area of greatest potential stress. As in the embodiment of FIG. 2, the end 232 of each bridge 226, 228 has a connection to the aircraft fuselage via pivoted joint 250, analogous to the pivoted joints 150 of the embodiment of FIG. 1. Each lower end 242 of the struts 222, 224 also has a pivoted joint 254 by which it is connected to a respective engine (or engine mount) 118 (120'). However, each end 234 of each bridge 226, 228 has a non-pivoted or direct connection 256 with each engine (or engine mount) 118 (120'), and each upper end 240 of each strut has a pivotal connection via pivoted joint 258 with each engine (or engine mount) 118 (120').

Those skilled in the art will appreciate that within this modified arrangement (in contrast to that of FIG. 2) of connections within a closed or boxed structural support loop path 200, which again incorporates the engine, bridge, airframe including crown supports, wing, and struts, the struts 222, 224 and bridges 226, 228 may be joined in various alternative arrangements, including direct or pivoted joint connections with respect to the fuselage and engine components of the aircraft. Such alternative arrangements may provide flexibility and/or opportunities for varied servicing protocols, as for example, servicing the engines or the engine mounts 118, 120'.

Continuing reference now to both FIGS. 2 and 3, the lower ends 142, 242 of the respective struts 124, 224 may be secured directly to a so-called wing box structure 160, 260 that includes beams supporting the main landing gears 110, 210. Those skilled in the art will appreciate that use of such wing box structures may enhance strength of the noted structural support loop paths 100, 200. The bridges 26, 28, 126, 128, etc., may be designed and/or attached to the aircraft so as to always provide a positive, or at worst a neutral, contribution to the overall lift profile of the aircraft. Finally, because the bridges extend laterally between the engine and fuselage of the aircraft, they may be bowed upwardly so as to define a convex curvature when viewed along the longitudinal axis of the aircraft. Such a curvature may, inter alia, optimize aerodynamic spacing of the bridges from the wing to minimize undesirable shock wave phenomena.

Figure 4:
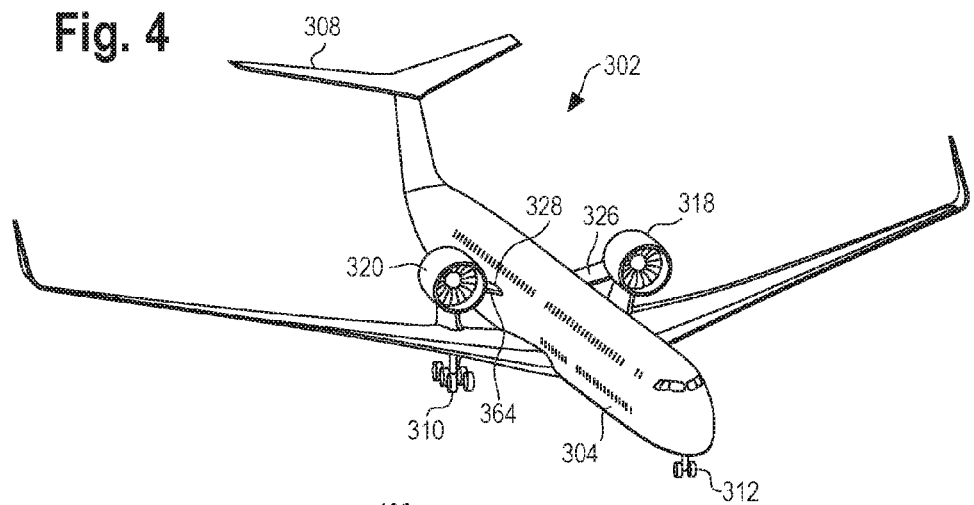
FIG. 4 is a perspective view of another low wing commercial aircraft having upper and lower passenger decks, having a pair of wings, with one of a pair of engines installed above each wing, each engine being mounted in accordance with another described embodiment of the present disclosure.

Referring now to FIG. 4, another embodiment of a commercial aircraft 302 incorporates modified bridge supports 326 and 328 of the engines 318 and 320, respectively. The commercial aircraft 302 of FIG. 4 is an aircraft having a two-story passenger deck. As depicted, the commercial aircraft 302 may be powered by a pair of ultrahigh bypass ratio turbofan engines 318, 320, as opposed to the open rotor-style engines 18, 20, etc., described with respect to the embodiments of FIGS. 1-3.

Figure 5:
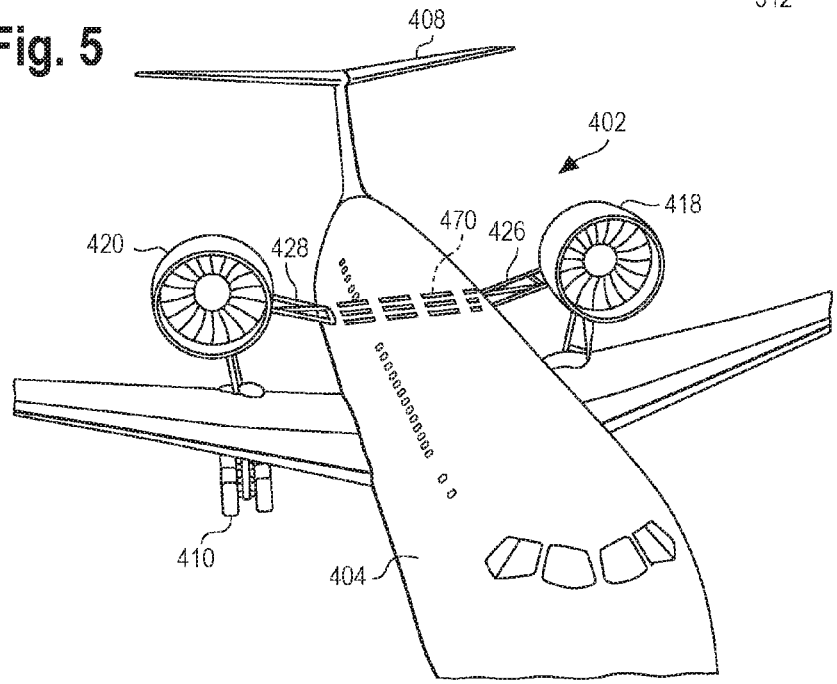
FIG. 5 is a fragmentary portion of another aircraft constructed in accordance with yet another embodiment the present disclosure.

In the embodiment of FIG. 4, the bridge supports 326, 328 may be formed in the nature of a load truss system covered with fairings 364 as shown, and as may be appreciated by those skilled in aircraft art. Referring now also to FIG. 5, bridge supports 426, 428 are shown with fairings removed, and a system of bridge support carry through truss beams 470 extend between the bridges 326, 328, through the floor/ceiling between passenger decks, in lieu of the airframe crown supports 30, 130, and 230 of the embodiments of FIGS. 1-3. The truss beams 470 may be designed to avoid deleterious reduction of space provided for passengers and/or cargo within the aircraft. In each of the turbofan embodiments disclosed herein, engine mounting points would not be directly attached to the engine nacelles, but rather to engine supporting structures, such as element 36 of FIG. 1A.

Figure 5A:
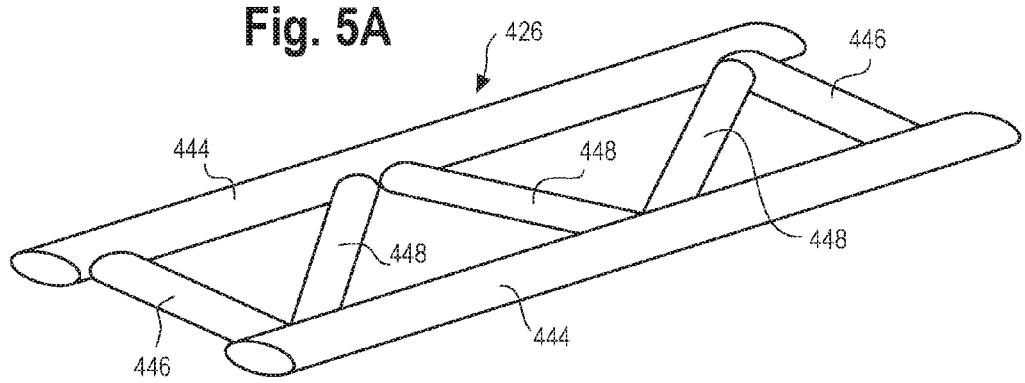
FIG. 5A is an enlarged view of a portion of the embodiment of FIG. 5.

FIG. 5A depicts an enlarged view of the left bridge support 426 of FIG. 5, reflecting only one of many potential truss style bridge configurations. In the embodiment shown, pairs of respective laterally and fore-aft extending truss support members 444, 446 are rigidly secured together, along with angled tie members 448, to form the bridge support 426. Actual securement of the members may be by welded connection, for example. As structural load carrying elements, each of the members 444, 446, and 448 of the bridge support 426 may be fabricated of metal tubes, as shown, or by alternate structures not shown. The metal tubes may be formed of, for example, an aluminum alloy.

Figure 6:
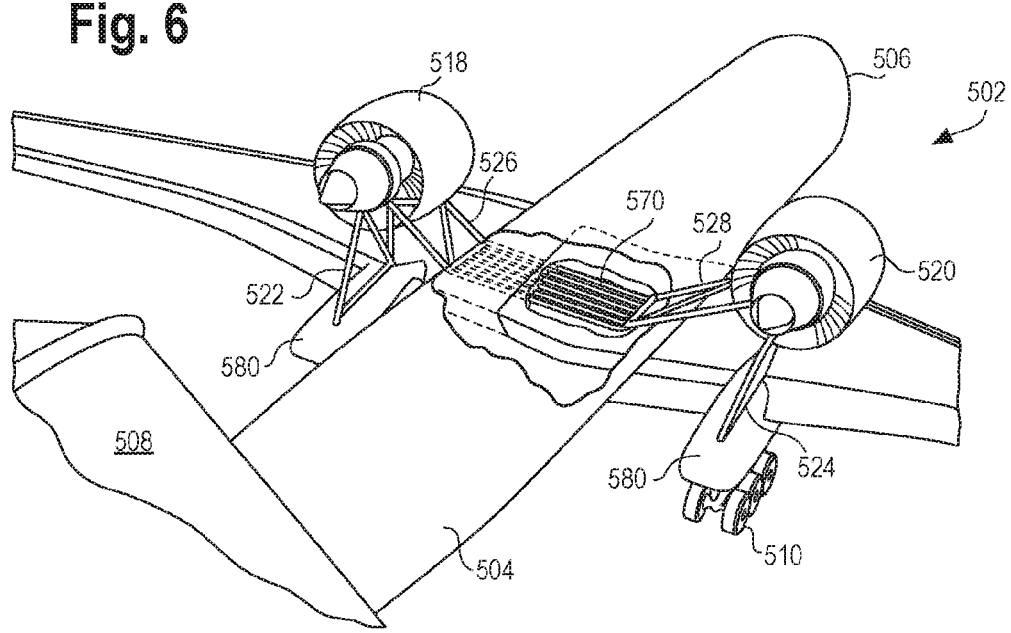
FIG. 6 is a fragmentary view of an aircraft constructed in accordance with another embodiment of the present disclosure.

Referring now to FIG. 6, another embodiment of a commercial aircraft 502 incorporates a further modification of struts 522, 524 and bridge supports 526 and 528 of engines 518 and 520, respectively. The commercial aircraft 502 of FIG. 6 has a two-story passenger deck, and is powered by a pair of ultrahigh bypass ratio turbofan engines 518, 520. As in a previously described embodiment, the commercial aircraft 502 incorporates carry through beams 570 that extend between and connect the bridge supports 526 and 528 at the floor/ceiling level between the upper and lower passenger decks. However, the arrangement of the struts 522, 524 provides support of engines 518, 520 over a pair of main landing gear pods 580 situated on an aft wing spar (not shown). This arrangement provides that the high bypass turbofan engines 518, 520 may be further rearwardly positioned on the aircraft to provide greater flexibility for assuring certain aerodynamic performance factors. For example, the arrangement may permit positioning the engines further aft to better match the aircraft centers of lift and/or gravity without inducing adverse torsional loads on the wings. In such arrangement, the main landing gear 510 may be retracted into a landing gear pod 580, as opposed to retraction into the fuselage in the manner of the previously described embodiments.

Figure 7:
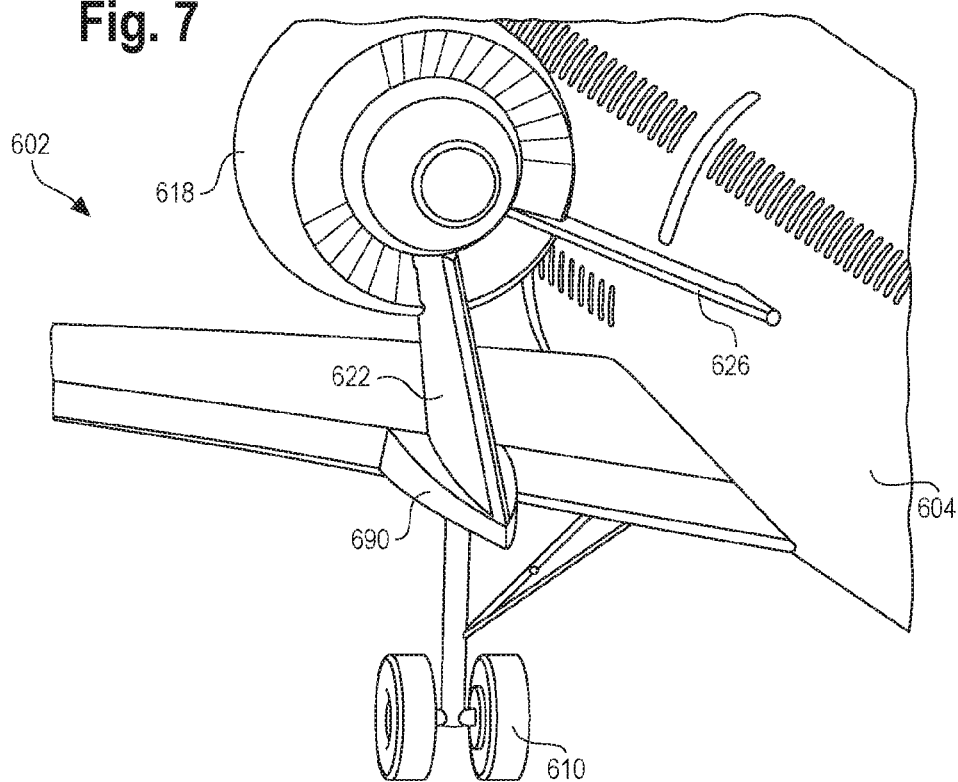
FIG. 7 is a fragmentary view of an aircraft constructed in accordance with yet another embodiment of the present disclosure.

Referring now to FIG. 7, another embodiment of a commercial aircraft 602 incorporates a further modification of a strut 622 and bridge support 626 of an engine 618, as shown. The commercial aircraft 602 has a two-story passenger deck, and is powered by a pair of ultrahigh bypass ratio turbofan engines similar to those described in the embodiment of FIG. 6. As in the embodiment of FIG. 6, the commercial aircraft 602 of FIG. 7 incorporates carry through beams (not shown), that extend between the bridge support 626 and its corresponding bridge support 628 (not shown) at the floor/ceiling level between upper and lower passenger decks. However, the particular arrangement of the struts 622 and 624 (not shown) provides for their support on a pair of cantilevered pylons 690 extending rearwardly of an aft wing spar (not shown). In this modification, the pylons 690 also support the main landing gear 610, which is hinged to the pylon to permit the gear to retract into a landing gear bay (not shown) of the fuselage. Hence, unlike that of the pod 580, the pylon 690 does not accommodate retraction of the gear 610 into the pylon structure 690. Finally, similar to the aircraft 502 of FIG. 6, the embodiment of FIG. 7 also provides that the high bypass turbofan engine 618 may be situated further rearwardly on the aircraft fuselage to provide greater design flexibility for optimizing aerodynamic performance.

Figure 7A:
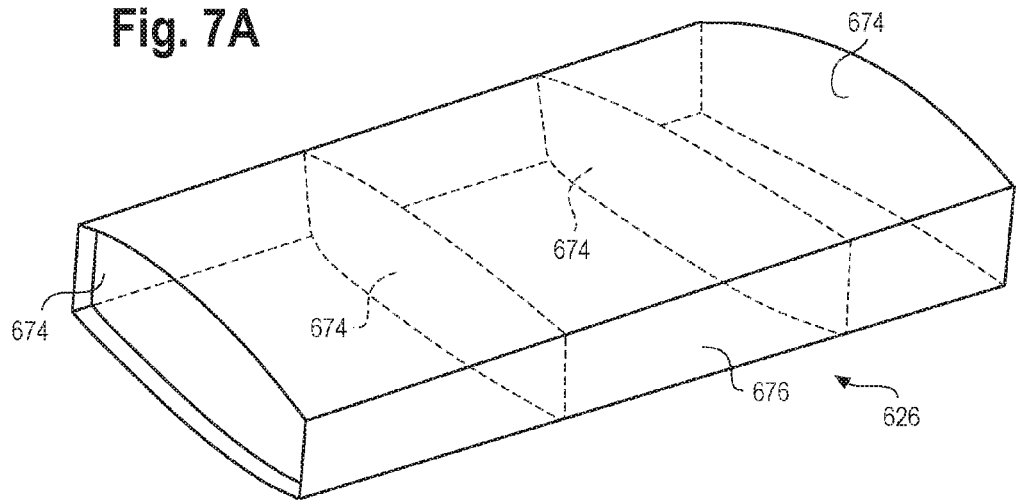
FIG. 7A is an enlarged view of a portion of the embodiment of FIG. 7.

FIG. 7A depicts an enlarged view of the left bridge support 626 of FIG. 7, revealing at least one potential box style bridge support configuration. In the embodiment shown, a plurality of laterally spaced support panels or stiffening ribs 674 are provided. There are four of such ribs 674 in the embodiment depicted, of which three are shown in phantom. The ribs provide structural support and framing about and to which exterior skin panels 676, such as the vertical panel 676 shown, are rigidly secured, for example via welding. The spacing of the stiffening ribs 674 may be determined as a function of required load capabilities, as those skilled in the art will appreciate. Skilled artisans will also appreciate that airfoil shaped leading and/or trailing edged attachments (not shown) may be secured to leading and/or trailing vertically oriented panels, such as the panel 674, for assuring optimized flight performance. Finally, as structural load bearing members, each of the elements 674, 676 may be formed of, for example, an aluminum alloy.

Figure 8:
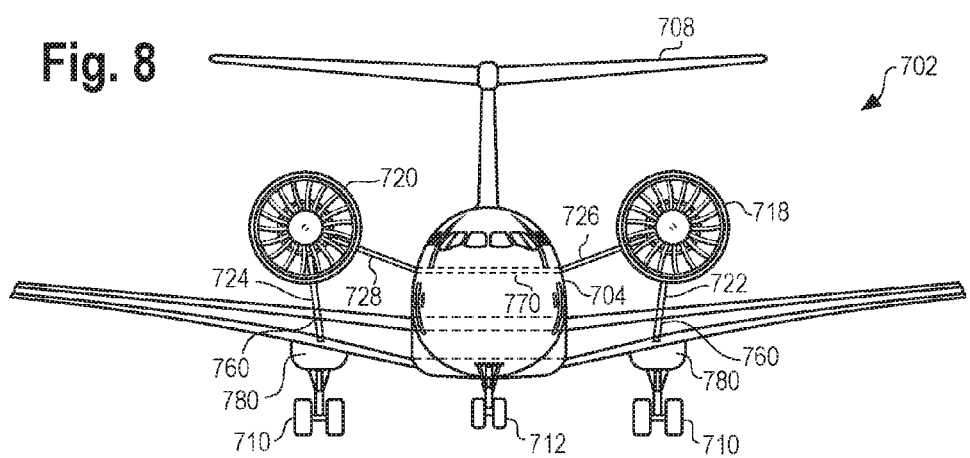
FIG. 8 is a view of an aircraft constructed in accordance with another embodiment of the present disclosure.

FIG. 8 introduces another embodiment of an aircraft 702 having a two-story passenger fuselage. The aircraft 702 employs a pair of high ratio bypass turbofan engines 718, 720, and includes a truss system having carry through beams 770 that extend between upper and lower passenger decks, similar to embodiments heretofore described. However, left and right engine support struts 722, 724 extend upwardly to the engines 718, 720 from both the main landing gear wing boxes 760 and the main landing gear pods 780. At least one of the attachment points to the gear wing boxes 760 and/or the landing gear pods 780 may be pivoted joints, in lieu of the non-pivoted or direct connections described above.

Figure 9:
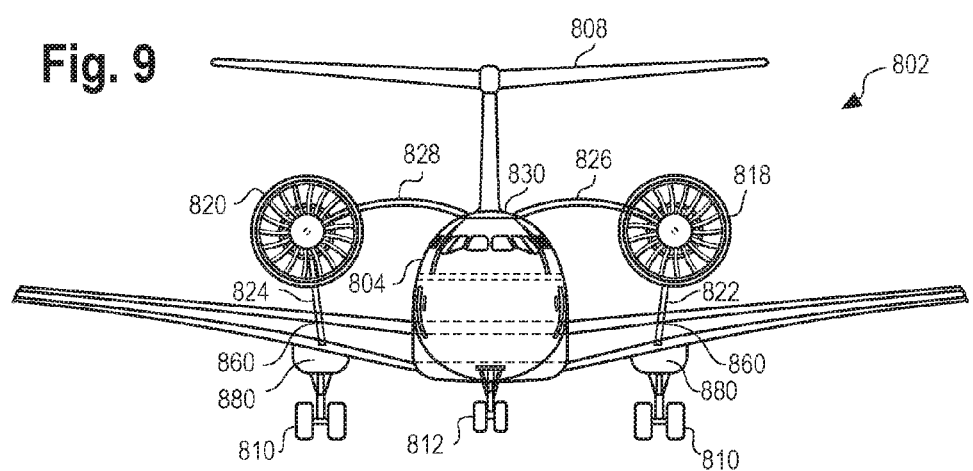
FIG. 9 is a view of an aircraft constructed in accordance with yet another embodiment of the present disclosure.

Finally, an aircraft 802 in FIG. 9 provides a variation of the structure described with respect to the aircraft 702 of FIG. 8. Thus, in FIG. 9, the aircraft 802 employs left and right engine support struts 822, 824 that extend upwardly to engines 818, 820 from dual attachments of main landing gear wing boxes 860 and main landing gear pods 880. However, in the embodiment of aircraft 802, the double-decker passenger fuselage 804 utilizes a crown support structure 830 for securing right and left bridge supports 826, 828 to the aircraft fuselage 804 in lieu of the carry through beams 770 in the aircraft 702 of FIG. 8. Where crown supports are employed to connect bridge supports 26, 28, 126, 128, etc., each bridge end 32, 132, 232 may be attached to each fuselage 4, 104, 204, respectively, in a manner so as to form an approximately perpendicular angle with respect to its attachment area on the typically convex exterior surface of the fuselage. As such, it should clearly be appreciated that the depictions shown and detailed with respect to various aspects and features, are only for economy and convenience of description.

Those skilled in the art will appreciate that all disclosed structures, including variations of bridge supports described herein, may incorporate numerous aerodynamic as well as damage tolerance features and enhancements. For example, the bridge supports may employ aerodynamically supportive cross-sections and surface geometries for minimizing interference drag coefficients, including those related to skin friction, parasitic and separation drag, as well as wave drag. As such, particular shapes of the struts may, for example, include plan form, sweep, sheer and twist aspects, all optimized to minimize drag associated with channel flows of air within the critical load region ringed by the bridges, struts, engines, and the wings, i.e. within the boxed structural support loop paths 100, 200. Such features may extend to actual geometries of strut attachments to wings, fuselage and/or propulsors for optimizing flight performance characteristics.

With respect to features of damage tolerance, in the event of structural damage to the bridge support, for example via bird strike or fragment impacts from failed engine parts or propulsor blades, the remaining supporting strut may offer redundancy of protection, in which the propulsor may be less likely to separate from the aircraft. Of course, damage tolerance considerations may include various aircraft operational procedures, such as shutting down the propulsor, feathering the propulsor propeller, reducing aircraft speed, and the like.

A method of enhancing aircraft performance by securing an aircraft engine to an aircraft fuselage may include the steps of providing a fuselage having a wing fixedly joined thereto, providing a first engine support on the wing, the first engine support configured to secure the aircraft engine to the wing in position above the wing; and providing a second engine support, the second engine support configured to extend from the fuselage to secure the engine to the fuselage above the wing separately from the first engine support.

The method may further include providing the first engine support as an upwardly extending wing strut, with the second engine support as a laterally extending bridge. In accordance with one approach, the bridge may define an upwardly extending bowed curvature. In another variation, the bridge may be formed of a metal truss system. In another variation, the bridge may be formed of a high strength composite structure. In yet another variation, such composite structure may include woven, braided, sandwich, and including isogrid structures, as examples.

Although numerous variations and features are shown and described herein, the disclosure is not intended to be limiting. For example, although FIGS. 1-3 depict aircraft having large open rotor engines, while FIGS. 4-9 depict aircraft having high bypass turbofan engines, the features described with respect to any particular embodiment may be paired with either type of engine. Moreover, each support bridge including those formed of truss elements (such as 426, 428) may incorporate fairings, such as the fairing 364, designed to reduce drag during flight.

What is claimed is:

1. An aircraft comprising:
   a fuselage;
   a wing structure secured to and extending laterally from the fuselage;
   a main landing gear;
   a main landing gear beam secured to the wing structure and fuselage for supporting the main landing gear;
   an engine configured for mounting above the wing structure;
   a support fixed to the main landing gear beam, the support configured to secure the engine to the main landing gear beam, and to hold the engine in a fixed position above the wing structure; and
   wherein a second support extends generally parallel to the wing, and secures the engine to the fuselage; the second support extending laterally only to the engine from a side of the fuselage nearest the engine.

2. The aircraft of claim 1, wherein the support is an upwardly extending strut.

3. The aircraft of claim 2, wherein the main landing gear beam further comprises a pylon, and wherein the strut is fixed to the pylon.

4. The aircraft of claim 3, wherein the wing structure comprises a wing box having fore and aft portions, and wherein the pylon is cantilevered from the aft portion of the wing box.

5. The aircraft of claim 4, wherein the strut is secured to both the wing box and the pylon.

6. The aircraft of claim 3, wherein the pylon also supports the main landing gear.

7. The aircraft of claim 1, further comprising a pod secured to the main landing gear beam, and wherein the support is an upwardly extending structure supported on the pod.

8. An aircraft propulsor mounting system, comprising:
an aircraft fuselage;
a wing structure secured to and extending laterally from the fuselage;
a landing gear;
a landing gear beam secured to the wing structure and fuselage for supporting the landing gear;
an aircraft propulsor configured for being mounted above the wing structure;
a support fixed to the landing gear beam, the support configured to secure the aircraft propulsor to the landing gear beam, and to hold the aircraft propulsor in a fixed position above the wing structure; and
wherein a second support extends generally parallel to the wing, and secures the aircraft propulsor to the fuselage; the second support extending laterally only to the aircraft propulsor from a side of the fuselage nearest the aircraft propulsor.

9. The aircraft propulsor mounting system of claim 8, wherein the support is an upwardly extending strut.

10. The aircraft propulsor mounting system of claim 9, wherein the main landing gear beam further comprises a pylon, and wherein the strut is fixed to the pylon.

11. The aircraft propulsor mounting system of claim 10, wherein the wing structure comprises a wing box having fore and aft portions, and wherein the pylon is cantilevered from the aft portion of the wing box.

12. The aircraft propulsor mounting system of claim 11, wherein the strut is secured to both the wing box and the pylon.

13. The aircraft propulsor mounting system of claim 10, wherein the pylon also supports the landing gear.

14. The aircraft propulsor mounting system of claim 8, further comprising a pod secured to the landing gear beam, and wherein the support is an upwardly extending structure supported on the pod.

15. A method of securing an above-wing propulsion engine to an aircraft, the method comprising the steps of:
forming an aircraft fuselage, the fuselage including a wing fixedly joined thereto, the wing extending laterally from the fuselage, and a landing gear fixed to the wing;
forming a landing gear beam on the aircraft, the landing gear beam configured to support the landing gear;
forming an engine support on the wing, the engine support configured to secure a propulsion engine to the wing in a position above the wing; and
securing the engine support to the landing gear beam; and
forming a second support to extend generally parallel to the wing, and
configuring the second support to secure the propulsion engine to the fuselage; the second support extending laterally only to the propulsion engine from a side of the fuselage nearest the propulsion engine.

16. The method of claim 15, wherein the engine support is an upwardly extending strut.

17. The method of claim 16, further including steps of a) forming the landing gear beam to include an aft-extending pylon, and b) fixing the strut to the pylon.

18. The method of claim 17, further including the step of configuring the pylon to support the landing gear.

19. The method of claim 17, wherein the wing defines a wing box, and the strut is fixed to both the wing box and the pylon.

20. The method of claim 15, further including the steps of a) forming a pod on the landing gear beam, and b) configuring the support as an upwardly extending structure supported on the pod.

* * * * *